United States Patent Office 2,948,597
Patented Aug. 9, 1960

2,948,597
NOVEL BORON COMPOUNDS AND GASOLINE CONTAINING THE SAME
Sarah H. Belden, Cleveland, Ohio, assignor to The Standard Oil Company, Cleveland, Ohio, a corporation of Ohio
No Drawing. Filed Dec. 30, 1958, Ser. No. 783,670
4 Claims. (Cl. 44—63)

This invention relates to novel boron compounds and to a gasoline containing the same. In particular, this invention relates to a class of novel boron compounds for use in gasoline which are prepared from a glycol borate and a substituted oxazoline compound, and which have the following general formula:

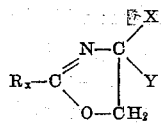

wherein X represents the group

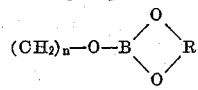

in which $n$ is a small whole number of from 1 to 3, R is selected from the group consisting of alpha and beta alkylene radicals having 3 to 20 carbon atoms; Y represents a radical selected from the group of X, hydrogen, or a lower alkyl radical having 1 to 3 carbon atoms; and $R_x$ represents a hydrocarbon radical containing 7 to 19 carbon atoms.

It is well known to the prior art that the introduction of boron into a gasoline produces beneficial effects on engine operation. However, few boron compounds have been found that are sufficiently soluble and stable in gasoline to be suitable for such purpose. The boron compounds of this invention are liquid products and, in contradistinction to many other classes of boron compounds, remains stable in the liquid phase resistant to crystallization even when exposed to very humid atmospheric conditions. Hence, these compounds lend themselves favorably to commercial plant blending since they may be readily pumped and metered during the gasoline blending operation.

The compounds of this invention, when dissolved in gasoline, also exhibit excellent stability to hydrolysis, enabling them to be satisfactorily used in large scale manufacturing and marketing operations where the gasoline containing the boron compound must be placed in storage tanks at bulk stations, at filling stations, and in the individual cars, all of which oftentimes contain small amounts of water at the bottom thereof. It will be obvious that unless the boron compound is hydrolytically stable, the contact of the gasoline will gradually result in the hydrolysis of the boron compound, resulting in the formation of boric acid or other compound forms which precipitate from the hydrocarbon phase to the water phase that is present and the additive is lost for any benefit in the combustion chamber. Solid precipitates forming from such unstable compounds may also clog fuel lines or otherwise interfere with the operation of the engine.

It has been found that the boron compounds of the present invention, when used in small amounts in gasoline, provide improvements in engine operation such as surface ignition suppression, reduction of ORI (octane requirement increase), greater valve life, and increased oil mileage such as is characteristic of boron-containing gasolines. In addition, the gasolines to which these compounds are added also exhibit bacterial action, carburetor detergency, and excellent anti-icing characteristics when used in an internal combustion engine. These compounds may be incorporated in gasoline in amounts to provide between 0.0001% and 0.005% of boron by weight, but amounts from 0.001% to 0.002% by weight are preferred.

The glycol borate compounds suitable for preparing the compounds of the present invention are taken from the class of compounds represented by the following general formula:

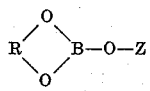

where R is an alpha or beta alkylene radical having from 3 to 20 carbon atoms and where Z represents hydrogen, or the group

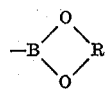

in which R is defined the same as above, and in which the total number of carbon atoms in the compound does not exceed 25. These compounds may be prepared by reacting orthoboric acid with the corresponding alpha glycol having the formula:

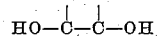

or the beta glycol having the formula:

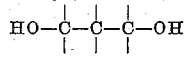

in which formulas the unattached valences are linked to hydrogen or to the straight chain or branched alkyl radicals to provide a total of 3 to 20 carbon atoms in the glycol.

Of the above class of compounds, 2-methyl pentanediol-2,4 hydrogen borate and bis(2-methyl pentanediol-2,4) diborate are particularly preferred as reactants for the present invention.

The substituted oxazoline compounds suitable for use in the preparation of the novel compounds of this invention are taken from the class of materials having the following general formula:

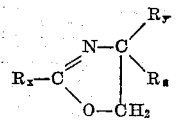

wherein $R_x$ represents a saturated or unsaturated hydrocarbon, preferably an aliphatic radical containing 7 to 19 carbon atoms, and where $R_y$ represents the radical $-(CH_2)_nOH$ where $n$ is a small whole number such as 1 to 3, and where $R_z$ represents a radical selected from the group consisting of $R_y$, hydrogen, or a lower alkyl radical having 1 to 3 carbon atoms.

The above compounds may be prepared from amino hydroxy compounds through their fatty amides or by any other known procedure. In preparing the oxazolines from the fatty acid amides, a suitable amino hydroxy compound is reacted with a desirable fatty acid or a mixture thereof at an elevated temperature to yield the amide. The temperature is then increased so as to split out water and form the oxazoline. More detailed information regarding the preparation of these substituted oxazolines using this procedure may be found in Patent Nos. 2,372,409 and 2,372,410.

The preferred oxazoline compounds for purposes of the present invention are those in which $R_x$ as defined heretofore contains 11 to 17 carbon atoms for maximum solubility in a hydrocarbon fuel. Mixtures of compounds may be used and this frequently will be the case since the $R_x$ radical is derived from naturally occurring fats and oils and $R_x$ will correspond to the fatty acid radicals in such fats and oils, such as tallow, cottonseed oil, soybean oil, tall oil, etc. Since the nature of $R_x$ does not affect the results appreciably, its selection will be dictated largely by economics. The commercial grade of the compounds including small amounts of impurities of by-products are suitable. Two compounds which are particularly desirable are 2-hepta decenyl 4,4-bis(hydroxy methyl) oxazoline which has the formula:

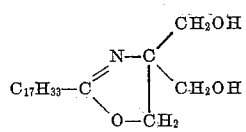

and 2-hepta-decenyl 4-hydroxy methyl oxazoline which has the formula:

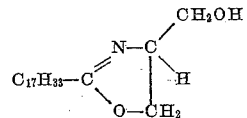

The substituted oxazoline reacts readily with the glycol borate at mildly elevated temperatures to form the boron compounds of the invention. When the substituted oxazoline in the reaction has two available hydroxy groups, such as when $R_x=R_y$ in the foregoing general formula, the oxazoline may be reacted with the glycol borate in a molar ratio of 1:1 or 1:2. When the oxazoline compound has only one hydroxy group available, such as when $R_z$ is hydrogen or a lower alkyl radical in the foregoing general formula, it is reacted mole for mole with the glycol borate to form the compounds of the invention. If water of reaction is formed in the reaction, it is preferred to remove all or a part of it from the reaction mixtue by separating it overhead, either by blowing with an inert gas such as nitrogen or by simple azeotropic distillation. A part of the water of reaction may remain in the reaction mixture if it is dispersed in the gasoline, such as with an alcohol or other mutual solvent.

Preparation of the compounds of this invention will be better understood in connection with the following examples which are offered to illustrate but not limit the invention.

*Example I*

36.9 gms. of 2-hepta decenyl 4,4-bis(hydroxy methyl) oxazoline was added to 28.8 gms. of 2-methyl pentanediol-2,4-hydrogen borate (a 1:2 molar ratio) dissolved in 200 cc. of benzene. The mixture was refluxed at the azeotropic distillation temperature for several hours for the removal of the water with the benzene from the reaction mixture. The water of reaction recovered measured 3.4 gms. and indicates that the reaction proceeds in accordance with the following equation:

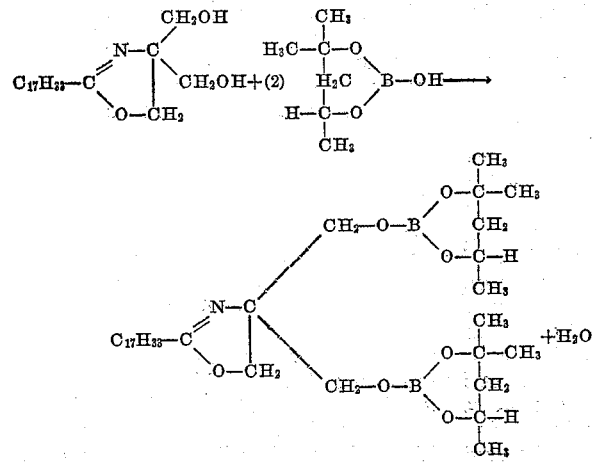

The compound of this example was found to be a glassy liquid of medium viscosity and was miscible in hydrocarbons, particularly gasoline. The product was tested for stability against hydrolysis by exposing samples in a moisture chamber maintained at 90% relative humidity at room temperature over night. No separation of any product of hydrolysis was noted.

*Example II*

36.9 gms. of 2-hepta decenyl 4,4-bis(hydroxy methyl) oxazoline was added to 26.9 gms. of bis(2-methyl pentanediol-2,4) diborate (a 1:1 molar ratio) dissolved in 200 cc. of benzene. The mixture was refluxed at the azeotropic distillation temperature for several hours for the removal of water with the benzene from the reaction mixture. The water of reaction recovered indicated that 1 mol of water was formed for each mol of 2-hepta decenyl 4,4-bis(hydroxy methyl) oxazoline and bis(2-methyl pentanediol-2,4) diborate reacting. The reaction proceeds in accordance with the following equation:

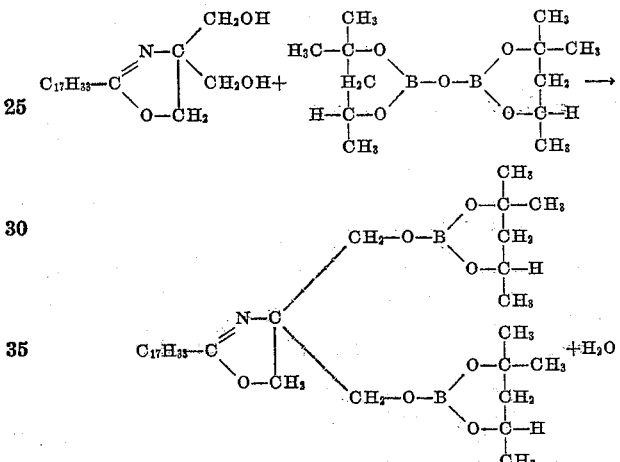

The compound of this example was identical in appearance to the compound of Example I.

*Example III*

The reaction of Example I was carried out using 1 mol of 2-methyl pentanediol-2,4 hydrogen borate for each mol of 2-hepta decenyl 4,4-bis(hydroxy methyl) oxazoline reacting with the recovery of 1 mol of water in accordance with the following equation:

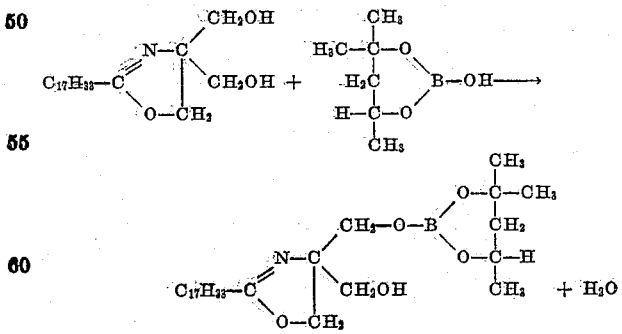

The compound of this example was a liquid of medium viscosity having physical properties very similar to the compound of Example I and was readily miscible in gasoline.

*Example IV*

35.2 gms. of 2-hepta decenyl 4-hydroxy methyl oxazoline was added to 14.4 gms. of 2-methyl pentanediol-2,4 hydrogen borate (a 1:1 molar ratio) dissolved in 200 cc. of benzene. The mixture was refluxed at the azeotropic distillation temperature for several hours for the removal of water with the benzene from the reaction mixture. The water of reaction recovered indicates that 1 mol of water was formed for each mol of 2-hepta decenyl 4-hydroxy methyl oxazoline and 2-methyl pentanediol-2,4 hydrogen borate reacting. The reaction proceeds according to the following equation:

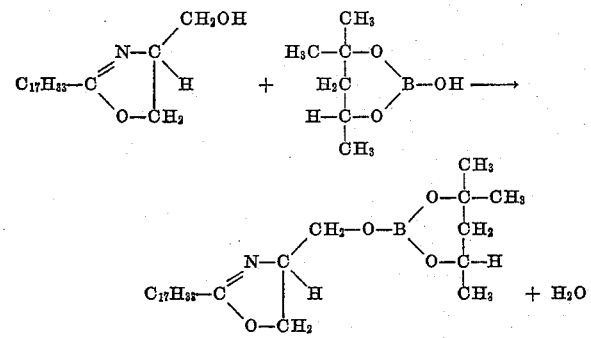

The compound of this example was found to be liquid of medium viscosity which was readily soluble in gasoline.

The compounds of Examples I, III, and IV were added to separate samples of a base fuel consisting of 59.8% ultraformate, 30.0% catalytic distillate, and 10.0% light naphtha and 0.2% solvent oil and containing tetraethyl lead in the amount of 3.0 ml. per gallon of fuel in amounts to provide .002% by weight boron.

The boron-containing fuels were compared with the base fuel in an ASTM-CFR single-cylinder engine to study surface ignition effect. During the test the total surface ignition count was observed electronically with care being taken so that all experimental conditions were the same for each test except the gasoline. The data from the runs showed that all the boron-containing fuels produced a lesser number of surface ignitions than the base fuel.

The same fuels were run for 60 hours in a high compression Oldsmobile engine initially clean of deposits having a compression ratio of 10:1. The octane requirement increase was determined for the engine under identical conditions after each run on a different fuel. The results showed that the ORI for the boron-containing fuels was lower than the value for the base fuel not containing boron.

These same fuels were subjected to a test in which a contamination system was employed with a 1954 Oldsmobile 10:1 compression engine having an initially clean carburetor to simulate the conditions which contribute to carburetor deposits developed in urban operation of motor vehicles. All experimental conditions were the same for the test with the exception of the gasolines. The carburetor was dismantled after each run and rated for cleanliness. The fuels containing the boron compounds of the invention were rated higher in cleanliness than the non boron-containing base fuel.

It is to be expected that various modifications of the above examples will suggest themselves to those skilled in the art upon a reading of the foregoing description. All such modifications are intended to be included as are defined in the appended claims.

I claim:

1. A gasoline motor fuel containing the compound having the following general formula:

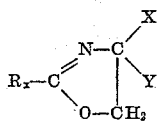

wherein X represents the group

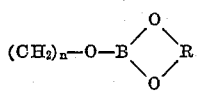

in which $n$ is a small whole number of from 1 to 3, R is selected from the group consisting of alpha and beta alkylene radicals having 3 to 20 carbon atoms; Y represents a radical selected from the group of X, hydrogen, and a lower alkyl radical having 1 to 3 carbon atoms; and $R_x$ represents a hydrocarbon radical containing 7 to 19 carbon atoms in amounts to provide between 0.0001% and 0.005% of boron by weight in said fuel.

2. A gasoline motor fuel containing the compound having the following general formula:

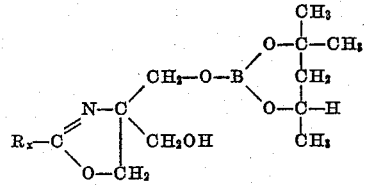

in which $R_x$ represents a hydrocarbon radical containing 7 to 19 carbon atoms in amounts to provide between 0.0001% and 0.005% of boron by weight in said fuel.

3. A gasoline motor fuel containing the compound having the following general formula:

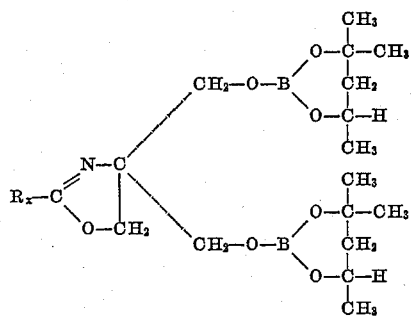

in which $R_x$ represents a hydrocarbon radical containing 7 to 19 carbon atoms in amounts to provide between 0.0001% and 0.005% of boron by weight in said fuel.

4. A gasoline motor fuel containing the compound having the following general formula:

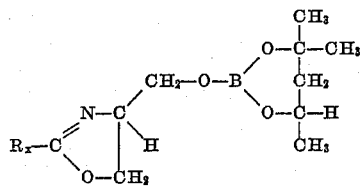

in which $R_x$ represents a hydrocarbon radical containing 7 to 19 carbon atoms in amounts to provide between 0.0001% and 0.005% of boron by weight in said fuel.

References Cited in the file of this patent

UNITED STATES PATENTS

| | | |
|---|---|---|
| 2,027,031 | Engelmann | Jan. 7, 1936 |
| 2,362,337 | Anderson | Nov. 7, 1944 |
| 2,382,906 | Pedersen et al. | Aug. 14, 1945 |
| 2,442,582 | Bishop | June 1, 1948 |
| 2,504,951 | Tryon | Apr. 25, 1950 |
| 2,692,191 | Haskell | Oct. 19, 1954 |
| 2,741,548 | Darling et al. | Apr. 10, 1956 |
| 2,769,010 | D'Amico | Oct. 30, 1956 |
| 2,839,564 | Garner | June 17, 1958 |
| 2,905,644 | Butter | Sept. 22, 1959 |